N. B. CONVERSE.
SPEED INDICATOR FOR AIRSHIPS.
APPLICATION FILED SEPT. 11, 1918.
1,334,229.
Patented Mar. 16, 1920.
2 SHEETS—SHEET 1.
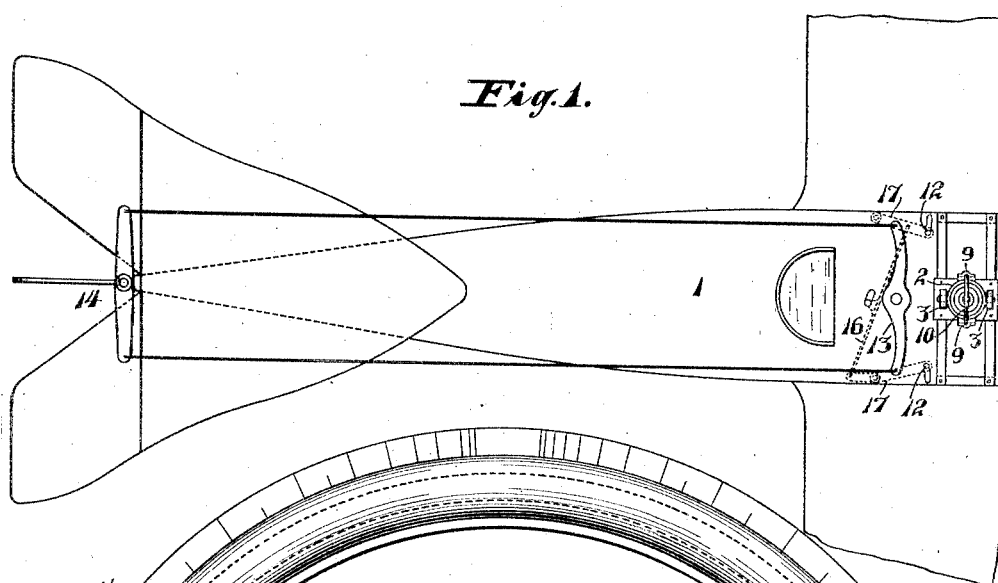
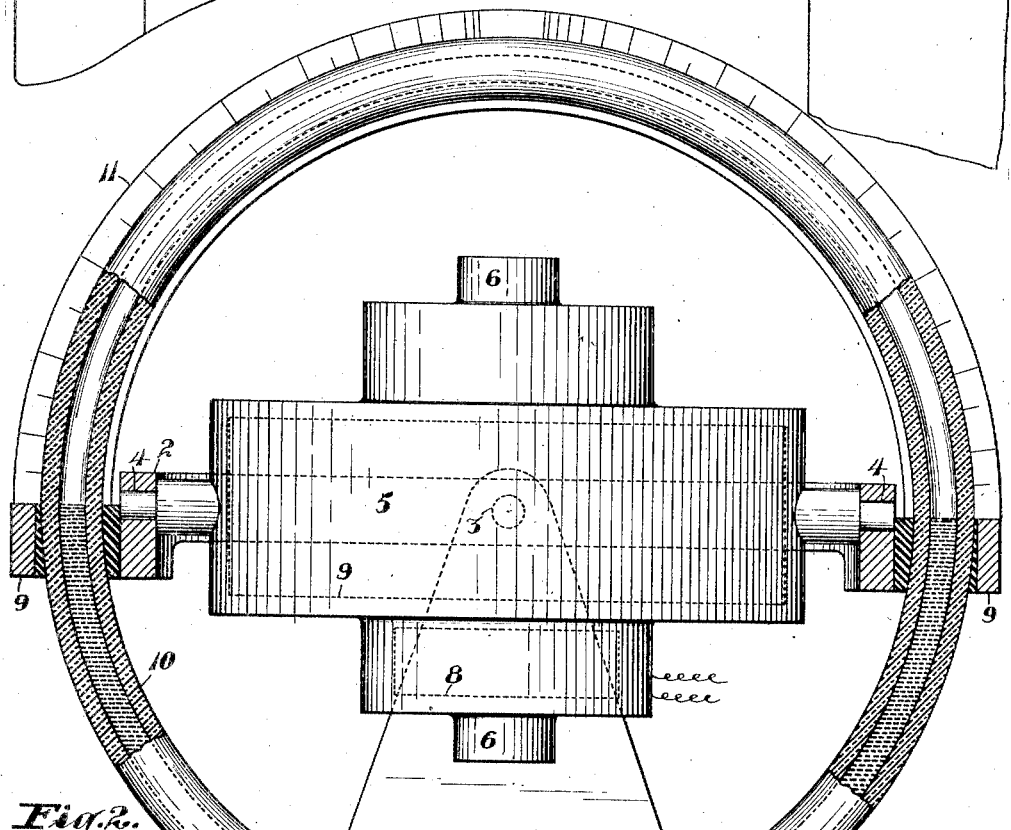
WITNESSES:
INVENTOR,
Newton B. Converse
By Francis M. Wright,
ATTORNEY

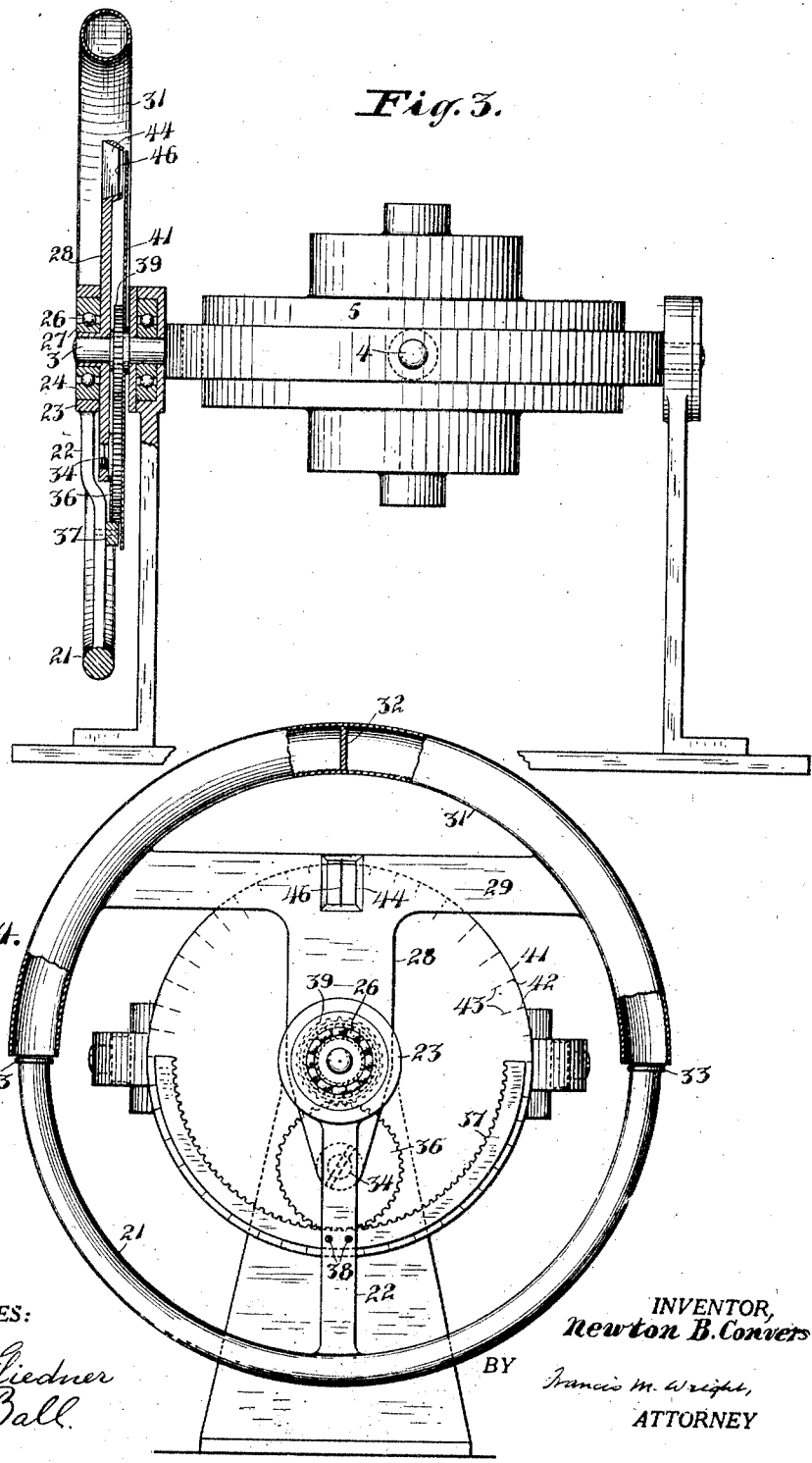

UNITED STATES PATENT OFFICE.

NEWTON B. CONVERSE, OF SAN FRANCISCO, CALIFORNIA.

SPEED-INDICATOR FOR AIRSHIPS.

1,334,229.   Specification of Letters Patent.   Patented Mar. 16, 1920.

Application filed September 11, 1918. Serial No. 253,668.

*To all whom it may concern:*

Be it known that I, NEWTON B. CONVERSE, a citizen of the United States, residing at San Francisco, in the county of San Francisco and State of California, have invented new and useful Improvements in Speed-Indicators for Airships, of which the following is a specification.

The object of the present invention is to provide an improved speed indicator for flying machines.

In the accompanying drawing, Figure 1 is a plan view of a portion of an aeroplane showing my improvement thereon; Fig. 2 is an enlarged vertical sectional view of the device; Fig. 3 is a broken side view, certain parts being shown in vertical section of a modification of my device; Fig. 4 is a broken rear view of the same.

Referring to the drawing, 1 indicates the body of an aeroplane, on which is mounted, in a position to be conveniently observed by the aviator, a horizontal gimbal ring 2, rotatable in bearings 3, supported upon the frame of the aeroplane. In this gimbal ring is pivoted, in transversely extending bearings 4, a casing 5, containing bearings 6 in vertical alinement with each other, in which rotates a shaft of an electric motor, carrying a gyroscope wheel 8, the motor receiving its current from any suitable source. To said gimbal ring are clamped by clamps 9 the sides of a circular glass tube 10 extending in a vertical plane around the gimbal ring. Said tube is filled with mercury to the level of its center, the mercury thus acting as a substantially frictionless pendulum. Behind the glass tube is placed a semi-circular indicator 11 containing a graduated scale.

12 indicates two stops which are placed on opposite sides in the path of a foot lever 13 which controls the lateral steering mechanism 14 of the machine. These stops are placed at such points in said path that, when the steering lever contacts with either of the stops and is arrested thereby, it is known that a certain deviation will be produced in the aeroplane, as, for instance, that it will describe a circle with a radius of 500 feet. These positions are determined with regard to any particular aeroplane by actual trial.

The manner in which the device is used is as follows:—When the aviator is flying straight ahead, and wishes to ascertain his actual speed relative to the earth, he steers the aeroplane to one side, in the arc of a circle of 500 feet radius as determined by the stops 12. The direction of force acting upon the mercury will then be changed from one purely vertical to one compounded of the direction of gravity and the direction of centrifugal force, which latter is a horizontal direction from the center about which the aviator is turning. The mercury will then move so that its center of gravity lies in the resultant line of force extending from the center of the circular tube. Therefore the mercury will rise on one side of the tube and fall on the other, it being remembered that the tube and indicator do not change their positions, being prevented by the gyroscope from rotating about its fore-and-aft bearings. The height to which the mercury rises in the tube will be a measure of the centrifugal force, and therefore of the change in momentum of the mercury, and, as this change in momentum varies as the square of the velocity, it will indicate the velocity of the mercury and therefore of the aeroplane. The aviator will now steer the aeroplane in the other direction through an arc of the same radius. If, during both changes in direction, the aviator is proceeding at the same velocity, the mercury will rise in the tube on one side to the same height as it did on the other. But if, owing to the wind, he is traveling at a greater velocity when making one change than when making the other, he will determine his velocity by taking the average of these two readings.

My improved speed indicator is also of great value in enabling the aviator, by making two turns, first to one side and then to the other, as before explained, to ascertain the direction and force of the wind. These can be determined by comparing the two readings on making the two turns with his speed in perfectly calm weather, ascertained by noting the number of revolutions of his propeller, which, in calm weather, gives him a known definite velocity.

The stops 12 may be normally out of the way of the foot lever, and may be moved into its path when it is desired to make an observation of the speed, by shifting a rod 16 which moves two levers 17 carrying the stops 12.

To obtain an accurate reading of the velocity there must be no side slip on the aeroplane when making the turn, but the proper banking of the aeroplane when turning will be effected by providing an automatic lateral stabilizer, such as that disclosed, for instance, in my application for Letters Patent, Serial No. 623,606. There may be a plurality of pairs of stops 12 provided, used for different speeds, the same indicating scale being used. These stops are arranged to arrest the foot lever so that circles are described whose radii are multiples of one another. The same indicator scale may then be used for both speeds, by multiplying the reading on the indicating scale by the quotient of the greater radius by the smaller.

In the modification of the invention shown in Figs. 3 and 4, I employ a solid pendulum 21 in the form of an arc of a semi-circle, the center of which arc is connected to a radially extending arm 22, the inner end of which is connected to a ring 23, around the inner ring 24, rotatably mounted, by ball-bearings 26, on a sleeve 27 rigidly secured to the shaft 3 of the gyroscope ring. To said sleeve is secured a T-shaped plate 28, of which the cross piece 29 is connected at its ends to a semi-circular tube 31 open at both ends and closed in the middle by a partition 32. The open ends of the tube are closely adjacent to the ends of the semi-circular pendulum when the latter is in its vertical position and said open ends of the tubes are slightly greater than heads 33 on the ends of the pendulum, so that the heads can move in said tube with but slight clearance to allow of the escape of air somewhat slowly, and thus to dampen or steady the oscillations of the pendulum. The lower end of the central member of said T-shaped plate carries a stud shaft 34, upon which rotates a gear wheel 36 in mesh with an internal segment wheel 37, secured, as shown at 38, to the arm 22, so that the oscillation of said pendulum causes said gear wheel to rotate with an angular velocity greater than that of the pendulum, as much as the radius of the segment gear is greater than that of the gear wheel. Said gear wheel meshes with a gear wheel 39, rotating loosely on the shaft 3 and secured to an indicating dial 41, having on its margin two series 42, 43, of graduation marks, one to the right and the other to the left, and indicating numbers, not here shown. These graduation marks are seen through an opening 44 in the T-shaped plate, and a wire 46 extends across said opening to facilitate the observation of the marks.

The mode of operation of the latter form of the invention is similar to that of the former and can be readily understood from the description thereof.

It differs therefrom in that it has a dampening means for steadying the oscillation of the pendulum and also in that the motion of the indicating scale is enlarged for a given angular motion of the pendulum.

I claim:—

1. In a speed indicator for a moving object, a gyroscope, a pendulum carried thereby, oscillatory about an axis in the direction of movement, and means for changing the horizontal direction of movement.

2. In a speed indicator for a moving object, a gyroscope, a pendulum carried thereby, oscillatory about an axis in the direction of movement, means for changing the horizontal direction of movement, and means for indicating the extent of rise of said pendulum due to such change.

3. In a speed indicator for a moving object, a gyroscope, a pendulum carried thereby, oscillatory about an axis in the direction of movement, means for changing the horizontal direction of movement through a known angle, and means for indicating the extent of rise of said pendulum due to such change.

4. In a speed indicator for a moving object, a gyroscope, a pendulum carried thereby, oscillatory about an axis in the direction of movement, means for preventing longitudinal movement of the pendulum relative to the gyroscope, and means for changing the horizontal direction of movement of the gyroscope and pendulum.

5. In a speed indicator for a moving object, a gyroscope, a pendulum carried thereby, oscillatory about an axis in the direction of movement, means for preventing longitudinal movement of the pendulum relative to the gyroscope, means for changing the horizontal direction of movement of the gyroscope and pendulum, and an indicating scale for indicating the rise of said pendulum.

6. In a speed indicator for a moving object, a gyroscope, a pendulum carried thereby, oscillatory about an axis in the direction of movement, means for preventing longitudinal movement of the pendulum relative to the gyroscope, means for changing the horizontal direction of movement of the gyroscope and pendulum through a known angle, and an indicating scale for indicating the rise of said pendulum.

In testimony whereof I have hereunto set my hand.

NEWTON B. CONVERSE.